US010912989B2

(12) United States Patent
Kornmann et al.

(10) Patent No.: US 10,912,989 B2
(45) Date of Patent: Feb. 9, 2021

(54) DETECTING AND PREVENTING CHEATING IN A LOCATION-BASED GAME

(71) Applicant: Niantic, Inc., San Francisco, CA (US)

(72) Inventors: David Kornmann, Tucson, AZ (US); Jim Wang, Brisbane, CA (US); Alexander Vladimirov, San Francisco, CA (US); Edward Wu, Kirkland, WA (US); Phillip Craig Keslin, San Jose, CA (US); Neal Kanodia, Mountain View, CA (US)

(73) Assignee: Niantic, Inc., San Francisco, CA (US)

( * ) Notice: Subject to any disclaimer, the term of this patent is extended or adjusted under 35 U.S.C. 154(b) by 0 days.

(21) Appl. No.: 16/600,333

(22) Filed: Oct. 11, 2019

(65) Prior Publication Data

US 2020/0038759 A1    Feb. 6, 2020

Related U.S. Application Data

(62) Division of application No. 14/336,552, filed as application No. 61/856,933 on Jul. 22, 2013, now Pat. No. 10,463,953.

(51) Int. Cl.
  *A63F 13/30* (2014.01)
  *A63F 13/70* (2014.01)
  *A63F 13/216* (2014.01)

(52) U.S. Cl.
  CPC .............. *A63F 13/12* (2013.01); *A63F 13/70* (2014.09); *A63F 13/216* (2014.09); *A63F 13/30* (2014.09);
  (Continued)

(58) Field of Classification Search
  CPC .. A63F 13/216; A63F 13/30; A63F 2300/807; A63F 13/00; A63F 13/10
  See application file for complete search history.

(56) References Cited

U.S. PATENT DOCUMENTS

| 6,530,841 B2 | 3/2003 | Bull et al. |
| 6,811,084 B2 | 11/2004 | Tatsuta et al. |

(Continued)

FOREIGN PATENT DOCUMENTS

| EP | 1574238 | 9/2005 |
| EP | 2101889 | 9/2009 |

(Continued)

OTHER PUBLICATIONS

Empire.Kred, www.empireavenue.com/about/, 1 page.

(Continued)

*Primary Examiner* — William H McCulloch, Jr.
*Assistant Examiner* — Ankit Doshi
(74) *Attorney, Agent, or Firm* — Fenwick & West LLP

(57) ABSTRACT

Systems and methods for detecting and preventing cheating in a location-based game are provided. In particular, a server-side statistical cheat detection algorithm can be implemented upon receiving a player request to perform a game action. A given dataset describing the respective times and locations of previous game events performed by the player can be analyzed to determine a probability that such game events represent legitimate gameplay. The determined probability can affect whether the player-requested game action is effectuated or can influence a number of points awarded for completion of the game action. An example system includes a host server and a client device in communication over a network.

20 Claims, 6 Drawing Sheets

(52) U.S. Cl.
CPC . *A63F 2300/5586* (2013.01); *A63F 2300/807* (2013.01)

(56) References Cited

U.S. PATENT DOCUMENTS

| | | | |
|---|---|---|---|
| 7,275,994 | B2 | 10/2007 | Eck et al. |
| 7,435,179 | B1 | 10/2008 | Ford |
| 7,450,060 | B2 | 11/2008 | Strachan |
| 7,491,123 | B2 | 2/2009 | Smith |
| 7,564,469 | B2 | 7/2009 | Cohen |
| 7,946,919 | B2 | 5/2011 | Piccionelli |
| 7,970,749 | B2 | 6/2011 | Uhlir et al. |
| 8,002,617 | B1 | 8/2011 | Uskela et al. |
| 8,070,608 | B2 | 12/2011 | Uhlir et al. |
| 8,108,459 | B1 | 1/2012 | Hoffman et al. |
| 8,190,733 | B1 | 5/2012 | Hoffman et al. |
| 8,267,794 | B2 | 9/2012 | Van Luchene |
| 8,287,383 | B1 | 10/2012 | Etter et al. |
| 8,291,016 | B1 | 10/2012 | Whitney et al. |
| 8,308,568 | B2 | 11/2012 | Amaitis et al. |
| 8,366,446 | B2 | 2/2013 | Kreiner et al. |
| 9,895,608 | B1 | 2/2018 | Auterio et al. |
| 2001/0009867 | A1 | 7/2001 | Sakaguchi et al. |
| 2002/0090985 | A1 | 7/2002 | Tochner et al. |
| 2003/0036428 | A1 | 2/2003 | Aasland |
| 2003/0224855 | A1 | 12/2003 | Cunningham |
| 2004/0029625 | A1 | 2/2004 | Annunziata |
| 2004/0058732 | A1 | 3/2004 | Piccionelli |
| 2004/0242321 | A1* | 12/2004 | Overton ................ A63F 13/75 463/29 |
| 2004/0255268 | A1 | 12/2004 | Meijer et al. |
| 2005/0049022 | A1 | 3/2005 | Mullen |
| 2006/0105838 | A1 | 5/2006 | Mullen |
| 2006/0281553 | A1 | 12/2006 | Hawkins et al. |
| 2006/0284789 | A1 | 12/2006 | Mullen |
| 2006/0287026 | A1 | 12/2006 | Mullen |
| 2007/0021166 | A1 | 1/2007 | Mattila |
| 2007/0060408 | A1 | 3/2007 | Schultz et al. |
| 2007/0104348 | A1 | 5/2007 | Cohen |
| 2007/0149284 | A1 | 6/2007 | Plavetich et al. |
| 2007/0281765 | A1 | 12/2007 | Mullen |
| 2007/0281766 | A1 | 12/2007 | Mullen |
| 2008/0015018 | A1 | 1/2008 | Mullen |
| 2008/0015024 | A1 | 1/2008 | Mullen |
| 2008/0146338 | A1 | 6/2008 | Bernard et al. |
| 2009/0005140 | A1 | 1/2009 | Rose et al. |
| 2009/0017913 | A1 | 1/2009 | Bell et al. |
| 2009/0024986 | A1 | 1/2009 | Meijer et al. |
| 2009/0281851 | A1 | 11/2009 | Newton et al. |
| 2010/0287011 | A1 | 11/2010 | Muchkaev |
| 2010/0323794 | A1 | 12/2010 | Su |
| 2010/0331089 | A1 | 12/2010 | Priebatsch et al. |
| 2011/0004658 | A1 | 1/2011 | Chesle et al. |
| 2011/0081973 | A1 | 4/2011 | Hall |
| 2011/0319148 | A1 | 12/2011 | Kinnebrew et al. |
| 2012/0040745 | A1 | 2/2012 | Auterio et al. |
| 2012/0052953 | A1 | 3/2012 | Annambhotla et al. |
| 2012/0094770 | A1 | 4/2012 | Hall |
| 2012/0157210 | A1 | 6/2012 | Hall |
| 2012/0185892 | A1 | 7/2012 | Camplejohn et al. |
| 2012/0190452 | A1 | 7/2012 | Weston et al. |
| 2012/0226627 | A1 | 9/2012 | Yang |
| 2012/0231887 | A1 | 9/2012 | Lee et al. |
| 2012/0233258 | A1 | 9/2012 | Vijayaraghavan et al. |
| 2012/0246104 | A1 | 9/2012 | Di Sciullo et al. |
| 2013/0002477 | A1 | 1/2013 | Dehnie et al. |
| 2013/0004932 | A1 | 1/2013 | Mahajan et al. |
| 2013/0005475 | A1 | 1/2013 | Mahajan et al. |
| 2013/0005480 | A1 | 1/2013 | Bethke et al. |
| 2013/0072308 | A1 | 3/2013 | Peck et al. |
| 2013/0117326 | A1 | 5/2013 | De Smet et al. |
| 2013/0178257 | A1 | 7/2013 | Langseth |
| 2013/0217485 | A1* | 8/2013 | Arnone ................ G06F 21/552 463/29 |
| 2016/0315992 | A1 | 10/2016 | Ottur et al. |

FOREIGN PATENT DOCUMENTS

| | | |
|---|---|---|
| EP | 2393056 | 12/2011 |
| EP | 2416289 | 2/2012 |
| WO | WO-02/062436 | 8/2002 |

OTHER PUBLICATIONS

Khoros, http://klout.com/klout_score, 4 pages.
Matyas, "Playful Geospatial Data Acquisition by Location-Based Gaming Communities," The International Journal of Virtual Reality, 2007, vol. 6, No. 3, pp. 1-10.
United States Office Action, U.S. Appl. No. 14/336,552, dated Apr. 5, 2018, 17 pages.
United States Office Action, U.S. Appl. No. 14/336,552, dated Mar. 15, 2019, 10 pages.

\* cited by examiner

DETECTING AND PREVENTING CHEATING IN A LOCATION-BASED GAME

PRIORITY CLAIM

This application is a divisional of U.S. application Ser. No. 14/336,552, filed on Jun. 21, 2014, which claims the benefit of U.S. Provisional Patent Application Ser. No. 61/856,933, titled Systems and Methods for Detecting and Preventing Cheating in a Location-Based Game, filed Jul. 22, 2013, both of which are incorporated by reference.

FIELD

The present disclosure relates generally to location-based games. In particular, the present disclosure relates to systems and methods for detecting and preventing cheating in a location-based game.

BACKGROUND

Advances in computing power and communications technologies have increased the availability and enjoyment of location-based computer gaming experiences. As an example, a location-based massively multiplayer parallel reality game can allow players to participate in the game by moving about in the real world while possessing a client device. The client device can be used to determine the position of the player. The player's location and actions in the real world can impact a parallel virtual game world.

Cheating in any game is a major problem that can destroy the game's enjoyment or appeal for players, and location-based games are not an exception to this rule. In particular, "honest" players that do not engage in cheating can be put at a disadvantage with respect to players who have cheated and gained some illicit advantage. The honest players put at a disadvantage can easily become disenfranchised and discontinue game participation, causing the game to lose a critical mass of player support.

As an example of cheating behavior in a location-based game, two individuals using two different client devices at two different locations may login to a single player account in an alternating fashion, thereby allowing the parallel game character to skip between two locations and gain an illegal advantage.

As another example, a player can engage in location spoofing tactics to tamper with or alter a location signal provided by her client device, thereby falsely convincing a host computing system that she is at various locations and gaining an illicit advantage.

As yet another example, certain location-based games can be designed to encourage players to go out, walk around, and discover their surroundings in a more intimate, educational fashion. However, players wanting to obtain points or achieve game objectives at an escalated pace may use a car or other modes of transportation to quickly move between locations, in effect disregarding or abusing unwritten or loosely enforced game rules concerning style of gameplay.

Thus, a problem faced by a game developer or game host is to have sufficient cheat detection and prevention procedures for enforcing rules or guidelines in a location-based game.

SUMMARY

One aspect of the present disclosure is directed to a game server for hosting a location-based game. The game server includes a processor, a memory, and a network interface for receiving data from a client device over a network. The game server is configured to perform operations. The operations include maintaining a database describing an event location and an event time for each of a plurality of game events. The operations include determining a plurality of inter-event velocities based on the event locations and the event times. Each inter-event velocity can describe a change in location and a change in time. The operations include respectively determining a plurality of event probabilities for the plurality of inter-event velocities. The operations include determining a dataset probability from the plurality of event probabilities.

Another aspect of the present disclosure is directed to a computer-implemented method for discouraging cheating. The method includes hosting, by one or more computing devices, a location-based game at a host computing system. The method includes logging, by the one or more computing devices in a database, an event location and an event time for each of a plurality of game events. The method includes receiving, by the one or more computing devices, a request to effectuate a requested game action. The request has a request location and a request time. The method includes calculating, by the one or more computing devices, an inter-event velocity based on at least one of the event locations and at least one of the event times. The inter-event velocity describes a change in location and a change in time. The method includes inputting, by the one or more computing devices, the inter-event velocity into a probability function to obtain an event probability. The method includes determining, by the one or more computing devices, whether to effectuate the requested game action based on the event probability.

Another aspect of the present disclosure is directed to a computing system for operating a location-based online game. The computing system includes a host computing system for hosting the location-based online game. The computing system includes a client device for providing access to the location-based online game to a player. The host computing system is configured to perform operations. The operations include generating a plurality of database entries respectively describing a plurality of game events performed by the player over time. Each database entry includes an event location and an event time. The operations include clustering the database entries based on event location to form a sequence of event clusters. The operations include determining a plurality of inter-event velocities respectively describing a change in location and a change in time between each pair of sequential event clusters. The operations include respectively inputting the plurality of inter-event velocities into a probability function to respectively determine a plurality of event probabilities.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A detailed discussion of embodiments directed to one of ordinary skill in the art is set forth in the specification, which makes reference to the appended figures, in which.

DETAILED DESCRIPTION

Figure 1:
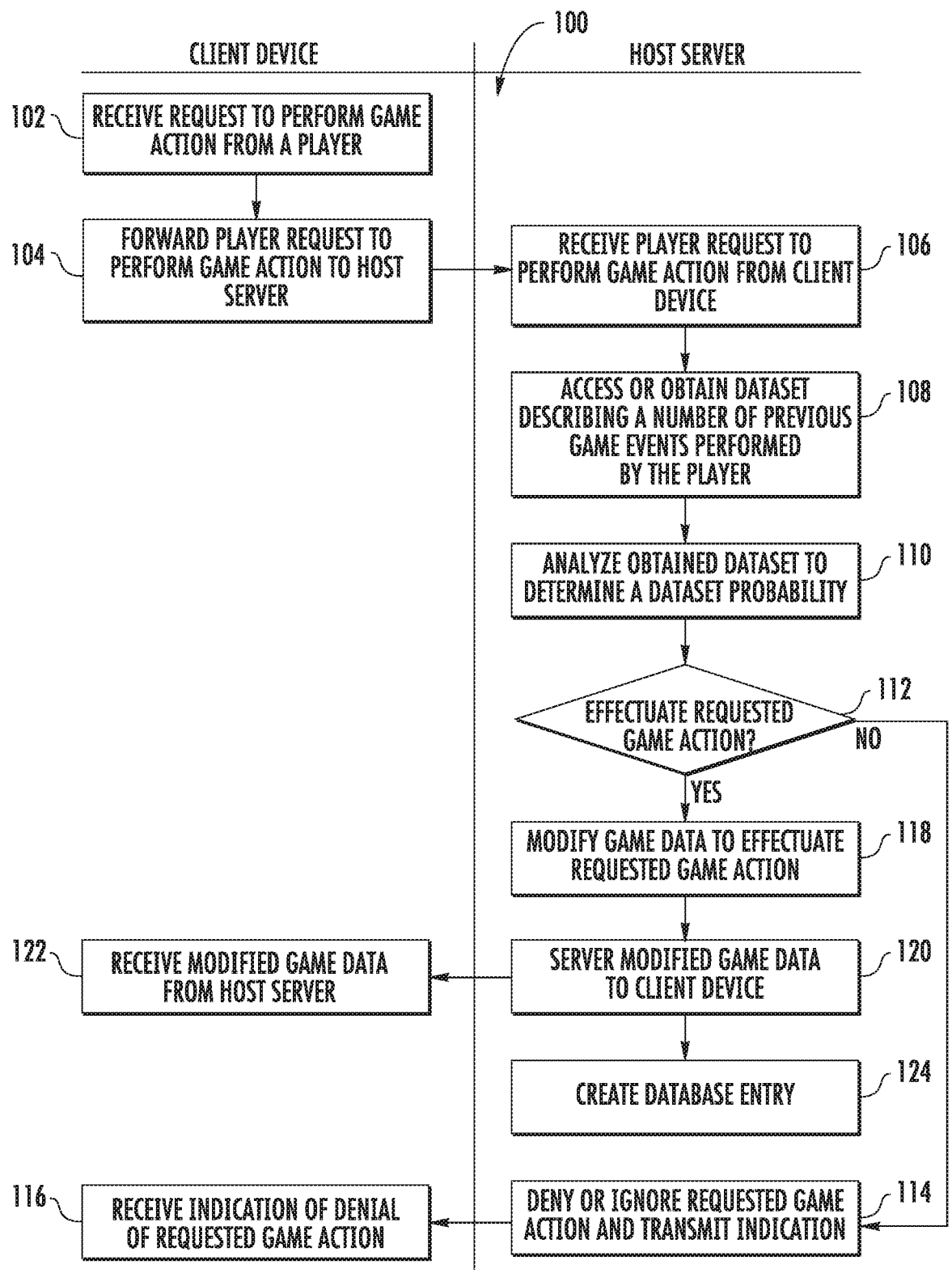
FIG. 1 depicts a flowchart of an example method for detecting and preventing cheating in a location-based game according to an example embodiment of the present disclosure.

The present disclosure is directed to systems and methods for detecting and preventing cheating in a location-based game. For example, a server-side statistical cheat detection algorithm can be implemented upon receiving a player request to perform a game action. The cheat detection algorithm can analyze a given dataset describing the respective times and locations of previous game events performed by the player to determine a probability that such game events represent legitimate gameplay. The determined probability can affect whether the player-requested game action is effectuated or can influence a number of points awarded for completion of the game action.

The systems and methods of the present disclosure can be used to assist in detecting cheating in a game in which client devices report their location to a game server, including, for example, a location-based massively multiplayer parallel reality game. In particular, a player can use a client device such as a smartphone, a PDA, a tablet, a netbook, or other suitable device to connect to a host server and play the location-based game as the player moves about in the real world. The client device can report its location whenever communicating with the host server and the player's location and actions in the real world can influence the status of a virtual parallel world. However, the present disclosure can be applied to other forms of games as well.

The host server can generate a database entry each time a game event is performed by a player. For example, a game event can be any game action or event that impacts the status of the game. The database entry can describe the nature of the game event, a player ID, an event location, and an event time. For example, the event location can include a latitude and a longitude, and the event time can include a timestamp.

The host server can then implement a cheat detection algorithm upon each instance of receiving a request from a player to effectuate or perform a game action. The cheat detection algorithm can include obtaining or accessing a dataset of the most recent game event database entries associated with the requesting player. For example, a pre-determined number of the most recent entries for the requesting player can be retrieved or only those entries that have an event time within a threshold from the current time can be retrieved.

According to an aspect of the present disclosure, one or more inter-event velocities can be determined based on the obtained dataset. Each inter-event velocity can describe a change in location ($\Delta x$) and a change in time ($\Delta t$). For example, the inter-event velocity can be a ratio of the change in location to the change in time ($\Delta x/\Delta t$).

As an example, a single inter-event velocity can be determined that simply describes the change in the player's location and difference in time with respect to the most recently performed game event. As another example, a plurality of inter-event velocities can be determined by calculating the change in location and change in time between each sequential database entry included in the obtained dataset.

As yet another example, the database entries can be clustered based on time and location. For example, the database entries can be analyzed with respect to event location such that sequential events that are within a threshold distance from each other are clustered together. A plurality of inter-event velocities can be determined that describe the change in location and change in time between each cluster of game events.

Each inter-event velocity can be input into a probability function ($p(\Delta x, \Delta t)$) to determine an event probability. The event probability can represent the probability that inputted inter-event velocity reflects legitimate gameplay.

As an example, the probability function can include a velocity threshold term ($v_a$) that is function of $\Delta t$. The velocity threshold can generally reflect the boundary of legitimate gameplay versus what should be considered cheating or abusive behavior in light of the particular game rules, game constraints, or collected game data.

As another example, the probability function can be a logistic function that provides a number between zero and one based on a difference between the inputted inter-event velocity and the velocity threshold term. In such fashion, inter-event velocities that are greater in magnitude than the velocity threshold term are assessed as less probable (i.e. an event probability closer to zero is output) while inter-event velocities that are lesser in magnitude that the velocity threshold term are assessed as more probable (i.e. an event probability closer to one is output by the probability function).

In embodiments in which a plurality of event probabilities are calculated, such event probabilities can be used to determine a dataset probability. The dataset probability can range from zero to one and can reflect a probability that the past game events included in the obtained dataset, taken as a whole, reflect legitimate gameplay.

As an example, the plurality of event probabilities can be averaged to determine the dataset probability. In some implementations, a weighted average can be used. As another example, the plurality of event probabilities can be multiplied together to determine the dataset probability.

In other implementations, an event probability is not necessarily calculated for each inter-event velocity. For example, one or more of the inter-event velocities can be inputted into an arbitrary function and the output of such arbitrary function can be used to determine the dataset probability. As an example, the dataset probability can be determined from or influenced by a mean or median of the inter-event velocities, a standard deviation of the inter-event velocities, or some other parameter exhibited by one or more of the inter-event velocities or calculated using an arbitrary function. For example, the output of the arbitrary function can be inputted into a suitable probability function to obtain the dataset probability. Generally, however, the dataset probability can represent a determined probability that the inter-event velocity data, when taken as a whole, represents legitimate gameplay.

The dataset probability can be used prevent or discourage cheating. For example, if the dataset probability is 0.2, then the algorithm has determined that there is only a 20% chance that the game events included in the dataset reflect legitimate gameplay. Therefore, the player-requested game action can be effectuated only 20% of the time, and 80% percent of the time the player-requested game action will fail or otherwise be ignored. As another example, the dataset probability can be used to influence points rewarded, such that, for example, the completion of the player-requested game action results in only 20% of an expected point reward.

With reference now to the FIGS., example embodiments of the present disclosure will now be discussed in detail. FIG. 1 depicts a flowchart of an example method (100) for detecting and preventing cheating in a location-based game according to an example embodiment of the present disclosure. Although FIG. 1 depicts steps performed in a particular order for purposes of illustration and discussion, various steps of the method (100) can be omitted, rearranged, combined, and/or adapted in various ways without deviating from the scope of the present disclosure.

At (102) a client device can receive input from a player requesting for a game action to be performed. For example, a player can operate the client device to play a location-based game in which the player's location and actions in the real world impact a parallel virtual game world. The player can use one or more input components of the client device to interact with and participate in the game and such input can be received at (102).

At (104) the client device can process the player request received at (102) and forward it to a host server. For example, the host server can be the client device's point of contact for an online multiplayer game. The host server can generally control the game's activities and the client device can request one or more game actions to performed, for example, via remote procedure calls. In some implementations, in addition to identifying the requested game action, the forwarded request can include information such as a player ID, a request location, and a request time. At (106) the host server can receive the player request forwarded at (104).

At (108) the host server can access or obtain a dataset describing a number of previous game events performed by the player. For example, the host server can maintain a database describing game events performed by a player over time. In particular, a database entry can be created for each game event performed by or on behalf of the player. Each database entry can include a player ID, an event location, such as a latitude and a longitude, an event time, and a description of the game event performed.

The dataset accessed or obtained at (108) can describe a predetermined number of game events performed by the player. Alternatively, the dataset can describe only game events that have occurred within a threshold period of time (i.e. have an event time within the threshold from the current time). Furthermore, the host server can include functionality to delete database entries which have event times older than a specific timestamp, so that player privacy is increased.

At (110) the host server can analyze the dataset obtained at (108) to obtain a dataset probability. The dataset probability can reflect a determined probability that the game events described by the obtained dataset, when taken as a whole, reflect legitimate gameplay.

As an example, analyzing the dataset at (110) can include determining one or more inter-event velocities based on the event locations and the event times described by the dataset. For example, a single inter-event velocity can be determined that simply describes the change in the player's location and difference in time with respect to the most recently performed game event. As another example, a plurality of inter-event velocities can be determined by calculating the change in location and change in time between each sequential database entry included in the obtained dataset.

As yet another example, the database entries can be clustered based on time and location. For example, the database entries can be analyzed with respect to event location such that sequential events that are within a threshold distance from each other are clustered together. A plurality of inter-event velocities can be determined that describe the change in location and change in time between each cluster of game events.

Analyzing the dataset at (110) can also include determining an event probability for each of the plurality of inter-event velocities. For example, each inter-event velocity can be inputted to a probability function to obtain an event probability.

The dataset probability can be determined based on the plurality of event probabilities. For example, the plurality of event probabilities can be averaged or multiplied together to determine the dataset probability. The dataset probability can be a determined probability that the events described by the dataset obtained at (108), taken as a whole, reflect legitimate gameplay.

While the present disclosure discusses a probability that certain data reflects legitimate gameplay, a complementary cheating probability can be determined, indicating the extent to which such data reflects cheating behavior. For example, the cheating probability and the dataset probability can sum together to one.

At (112) the host server can determine whether to effectuate the requested game action in light of the dataset probability determined at (110). For example, in some implementations, the host server can perform operations such that the dataset probability is translated into a percentage chance that the game action will be effectuated. Thus, if the dataset probability determined at (110) equals 0.2, then there can be a 20% chance that it is determined that the game action will be effectuated at (112).

If the host server determines at (112) that the requested game action should not be effectuated, then method (100) can proceed to (114). At (114) the host server can deny or ignore the player request received at (106). Optionally, the host server can transmit an indication of such denial to the client device at (114). If such an indication is transmitted, then the client device can receive it at (116) and optionally present it to the player via a display or otherwise.

However, if the host server determines at (112) that the requested game action should be effectuated, then method (100) can proceed to (118) and the host server can modify game data to effectuate the requested game action. For example, the host server can store in a local database game data that describes or controls a current status of all features or elements of the game. The host server can modify such game data to implement any needed change in status so that the game action requested by the player is effectuated.

At (120) the host server can serve the modified game data to the client device, for example, over a network. At (122) the client device can receive the modified game data from the host server and optionally present it to the player via a display or otherwise.

While method (100) of FIG. 1 illustrates the host server modifying game data to effectuate the requested game action at (118) after determining a dataset probability at (110) and determining at (112) whether the game action should be effectuated, in some implementations of the present disclosure, aspects of computing or modifying game data to effectuate the requested game action can be performed in parallel to other steps of method (100), such as steps (110) and (112). Thus, all potential changes to game data or game status potentially resulting from effectuation of the requested game action can be computed in parallel to the determination of a dataset probability. Then, if it is determined at (112) that the game action should be effectuated, the pre-computed changes can be stored or otherwise implemented at that time. In such fashion, computational efficiency and, therefore, the player game experience can be improved.

Figure 2A:
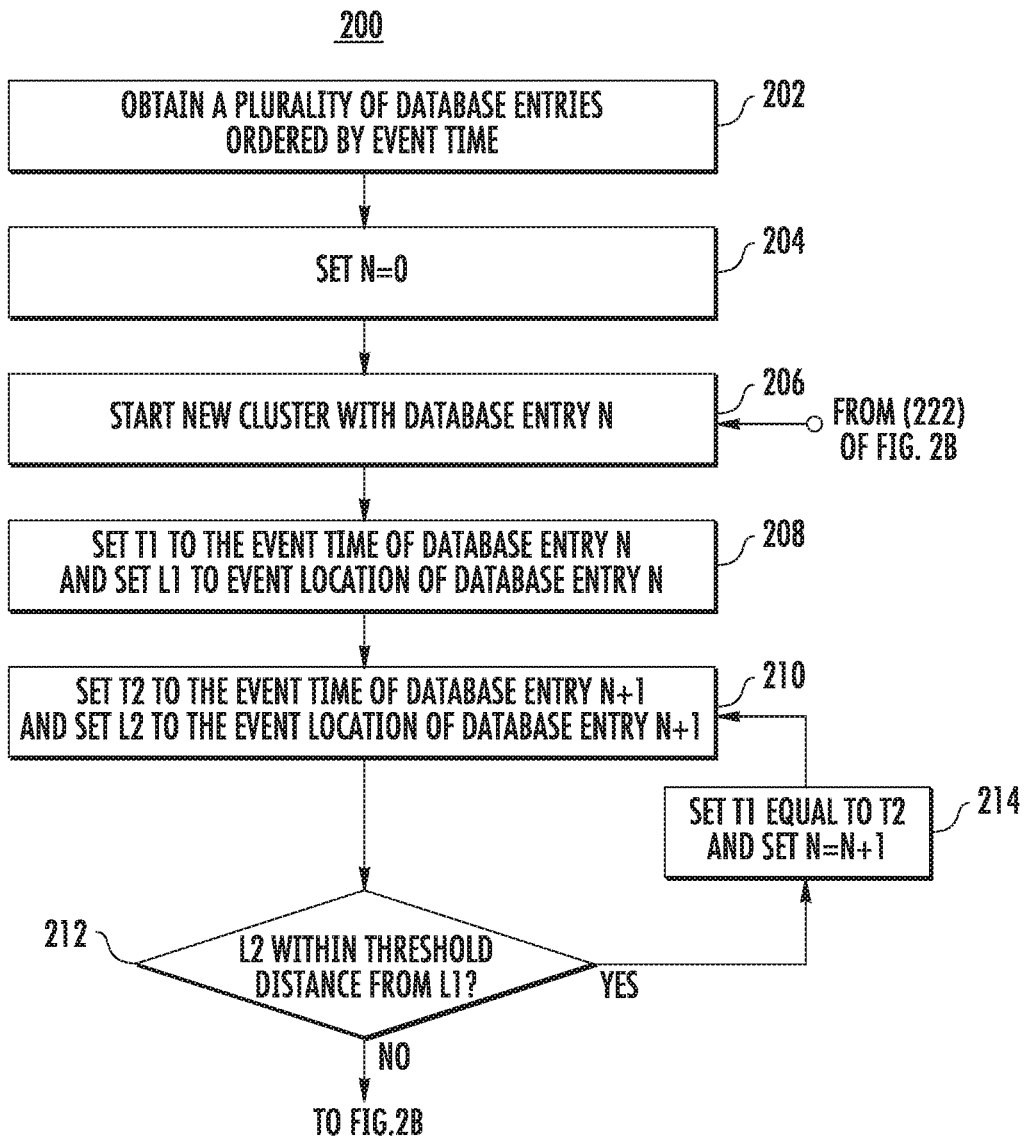
FIGS. 2A and 2B depict a flowchart of an example method for detecting and preventing cheating in a location-based game according to an example embodiment of the present disclosure.
Figure 2B:
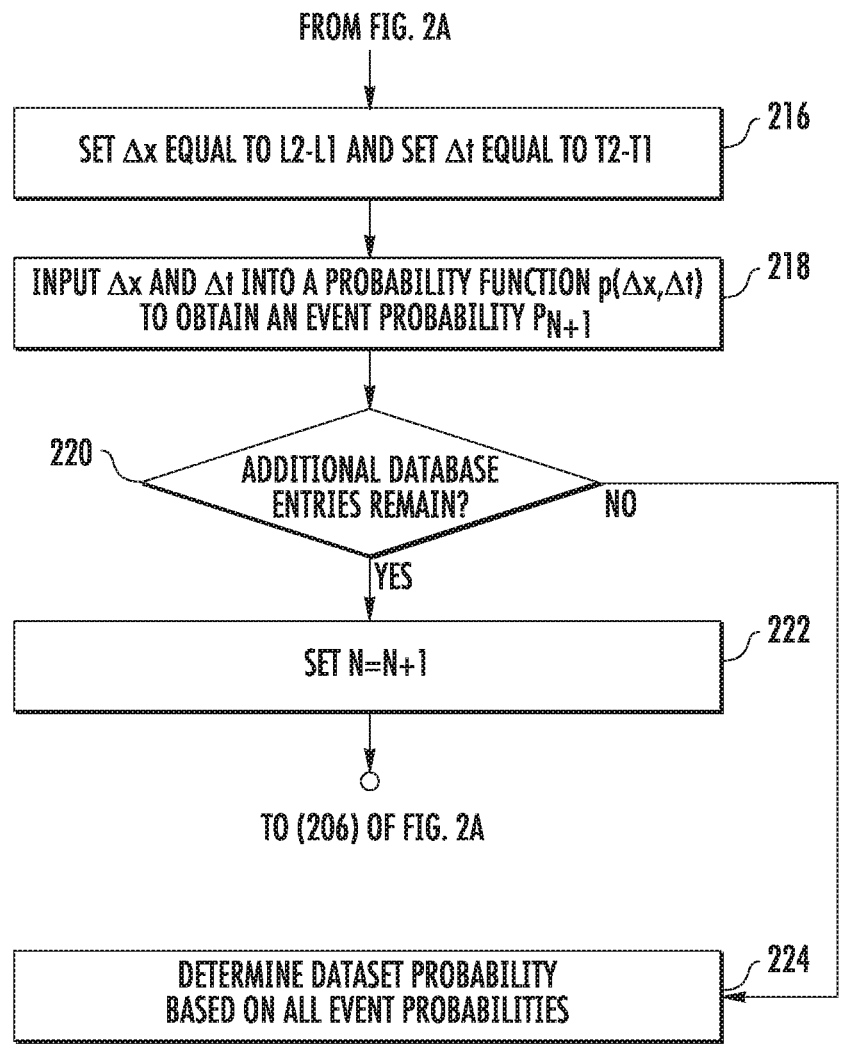

FIGS. 2A and 2B depict a flowchart of an example method (200) for detecting and preventing cheating in a location-based game according to an example embodiment of the present disclosure. Although FIGS. 2A and 2B depict steps performed in a particular order for purposes of illustration and discussion, various steps of the method (200) can be omitted, rearranged, combined, and/or adapted in various ways without deviating from the scope of the present disclosure.

At (202) a plurality of database entries ordered by event time can be obtained. For example, each database entry can describe one of a plurality of past game events associated with a player and can provide an event location and an event time. The events can be ordered by event time such that the first listed database entry (e.g. database entry 0) has the most distant (i.e. least recent) event time.

At (204) a variable ("N") can be set to zero. In some implementations, N can be initially set to one rather than zero depending upon the particular numbering scheme employed by the database.

At (206) a new cluster can be started with database entry N. For example, for the first iteration of (206), a new cluster can be started with database entry 0.

At (208) a pair of variables T1 and L1 can respectively be set to the event time of database entry N and the event location of database entry N.

At (210) a second pair of variables T2 and L2 can respectively be set to the event time of database entry N+1 and the event location of database entry N+1.

At (212) it can be determined whether L2 is within a threshold distance from L1. For example, each of L2 and L1 can respectively include a latitude and a longitude. Procedures for determining a distance between respective pairs of latitudes and longitudes can be used.

If it is determined at (212) that L2 is within the threshold distance from L1, then method (200) can proceed to (214). At (214) T1 can be set equal to T2. In addition, the variable N can be set equal to N+1, or otherwise incremented. Method (200) can then return to (210). In such fashion, all sequential events that remain within the threshold distance from L1 are grouped within the same cluster. Further, for each instance in which one of the database entries is grouped into such cluster, the time is updated to reflect the most recent event time.

However, if it is determined at (214) that L2 is not within the threshold distance from L1, then method (200) can proceed to (216) of FIG. 2B.

Referring now to FIG. 2B, at (216) a change in location and a change in time can be determined. In particular, the change in location ($\Delta x$) can equal L2-L1 and the change in time ($\Delta t$) can equal T2-T1. Together, $\Delta x$ and $\Delta t$ can be considered as an inter-event velocity. In particular, the inter-event velocity can be the ratio of $\Delta x$ to $\Delta t$.

At (218) $\Delta x$ and $\Delta t$ can be entered into a probability function p($\Delta x$, $\Delta t$) to obtain an event probability ($P_{N+1}$). As an example, the probability function can be a logistic function that provides a number between zero and one based on a difference between the inputted inter-event velocity and a velocity threshold term. For example, the velocity threshold term can be a continuous function of $\Delta t$. The obtained event probability $P_{N+1}$ can be additionally be stored in memory at (218).

At (220) it is determined whether additional database entries remain in the dataset obtained at (202). If it is determined that additional database entries do remain, then method (200) can proceed to (222) wherein N can be set to N+1, or otherwise incremented.

After (222), method (200) can return to (206) of FIG. 2A and start a new cluster with database entry N. In such fashion, the plurality of database entries obtained at (202) can be sequentially clustered based on event location. Further, an inter-event velocity can be determined between each pair of sequential clusters. Clustering in this fashion can increase computational efficiency.

When it is determined at (220) that additional database entries do not remain, method (200) can proceed to (224). At (224) a dataset probability can be determined based on all previously obtained event probabilities.

As an example, an average can be taken of all previously obtained event probabilities. For example, the average can be a simple arithmetic mean. Alternatively, more complex weighted averaging can be performed at (224) so that, for example, event probabilities associated with more recent inter-event velocities exert greater influence over the resulting dataset probability.

As another example, all previously obtained event probabilities can be multiplied together at (224) to obtain the dataset probability.

Figure 3:
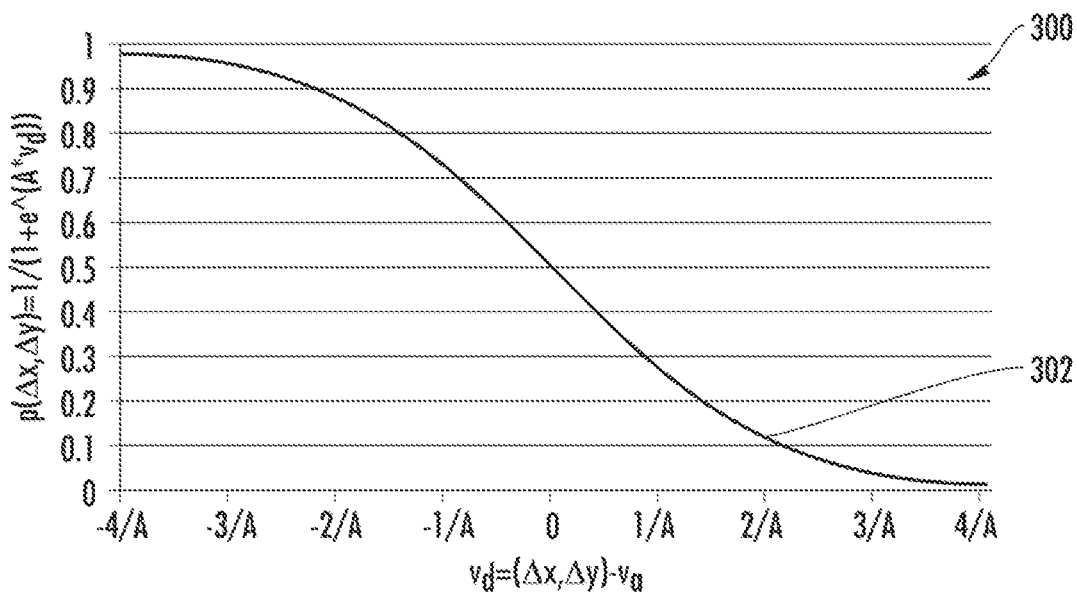
FIG. 3 depicts a graphical representation of a probability function according to an example embodiment of the present disclosure.

FIG. 3 depicts a graphical representation 300 of a probability function according to an example embodiment of the present disclosure. In particular, a plot 302 of the probability function is provided on graphical representation 300. The example probability function depicted in FIG. 3 is provided for the purposes of explanation only. Many different and unique probability functions can be used to satisfy the present disclosure without deviating from the scope of the present disclosure, including probability functions which are either more or less complex in nature.

Provided on the horizontal-axis of graphical representation 300 are values of a velocity difference term ($v_d$). In particular, the velocity difference term equals a velocity threshold term ($v_a$) subtracted from an inter-event velocity expressed as the ratio of $\Delta x$ to $\Delta t$.

As will be discussed further with respect to FIG. 4, the velocity threshold term $v_a$ can be designed to provide an upper threshold of game-legitimate velocities as a continuous function of $\Delta t$. Thus, the velocity difference term $v_d$ can provide a comparison of the inputted inter-event velocity with such upper threshold of legitimate gameplay.

Provided on the vertical-axis of graphical representation 300 are values of the probability function p($\Delta x$, $\Delta t$). In particular, as shown, the probability function p($\Delta x$, $\Delta t$) can be a logistic function that trends toward zero as the inter-event velocity increases in magnitude with respect to the velocity threshold term and trends towards one as the inter-event velocity decreases in magnitude with respect to the velocity threshold term.

The probability function can include a scaling term (A). A can be a constant or can include variables.

Furthermore, while the probability function depicted in FIG. 3 is a single continuous expression, the present disclosure can be implemented using a probability function that is piecewise in nature. As an example, a piecewise probability function can include one or more subfunctions that apply to inputted inter-event velocities with a Δt less than a particular value. For example, when the Δt is zero or less than a threshold number, then such subfunction can apply and can return a one when the Δx is less than a given number and can return a zero if Δx is greater than the given number. As another example, a piecewise probability function can include one or more subfunctions that return a zero for any (Δx/Δt) that is greater than a particular number.

Figure 4:
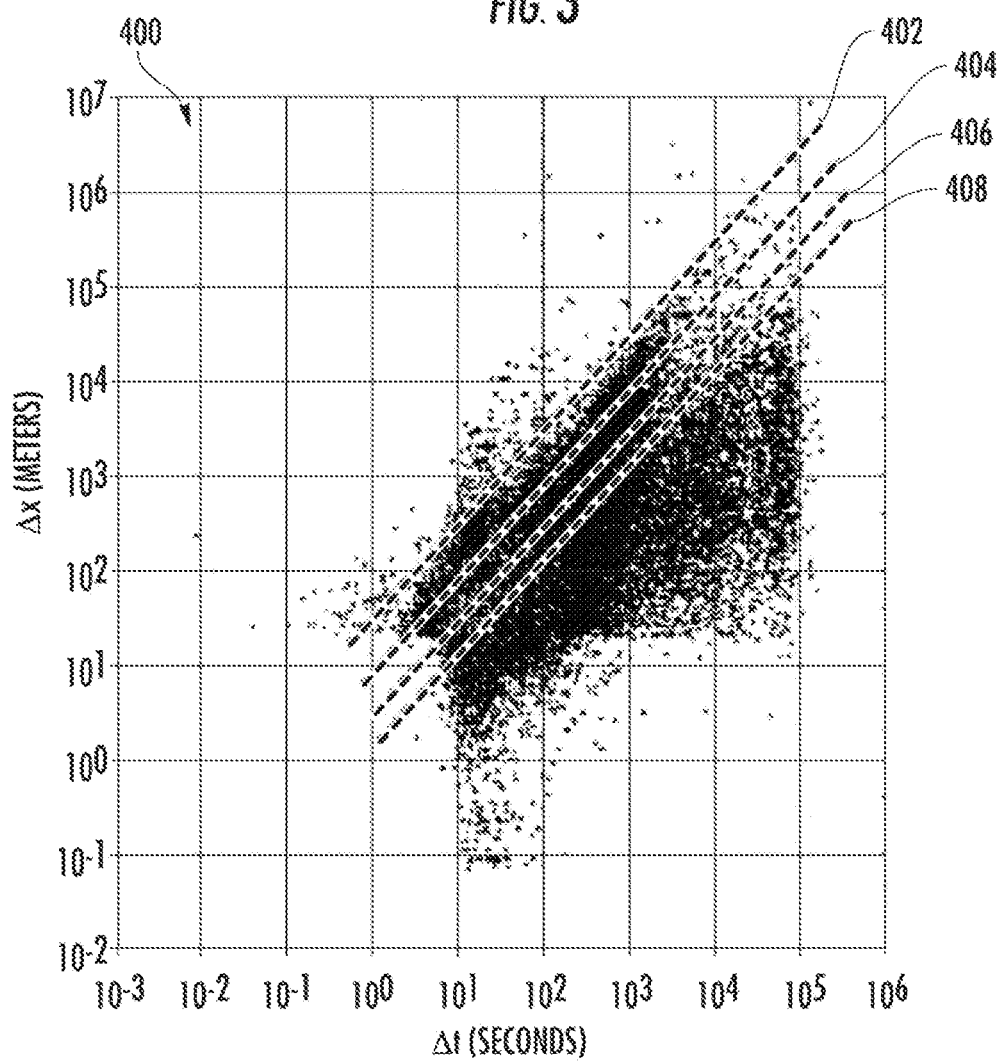
FIG. 4 depicts a graphical representation of inter-event velocity data according to an example embodiment of the present disclosure.

FIG. 4 depicts a graphical representation 400 of inter-event velocity data according to an example embodiment of the present disclosure. Provided on the horizontal axis of graphical representation 400 are values of Δt expressed in a logarithmic scale of seconds. Provided on the vertical axis of graphical representation 400 are values of Δx expressed in a logarithmic scale of meters. Thus, each data point plotted on graphical representation 400 can represent an inter-event velocity determined from collected game play data.

Also depicted in graphical representation 400 are plots 402-408 respectively depicting typical velocities for various transportation modes. For example, plot 402 provides a typical velocity for driving of 75 MPH/120 KPH. Plot 404 provides a typical velocity for bicycling of 20 MPH/35 KPH. Plot 406 provides a typical velocity for running of 8 MPH/13 KPH. Plot 408 provides a typical velocity for walking of 4 MPH/6.5 KPH.

According to an aspect of the present disclosure, the velocity threshold term can be a continuous function of Δt (i.e. $v_a(\Delta t)$). According to another aspect of the present disclosure, for every value of Δt, $v_a$ can equal a velocity at a boundary between legitimate gameplay and abusive game behavior.

Thus, as an example, $v_a$ can be designed or formulated based on a set of rules associated with the game to which the present disclosure will be applied. For example, if use of a vehicle such as a bicycle, car, or other similar vehicle is prohibited by game rules, then $v_a(\Delta t)$ can be formulated such that it generally follows plot 406. In such fashion, with reference to the example probability function of FIG. 3, inter-event velocities greater than 8 MPH/13 KPH will result in a larger velocity difference term ($v_d$) and, therefore, receive a lower event probability from p(Δx, Δt).

Returning to FIG. 4, as another example, $v_a$ can be designed, formulated, or revised based on collected game data. For example, with reference to the inter-event velocity data depicted in graphical representation 400, it is apparent that there is a recognizable boundary between statistically normal game activity and outliers of elevated velocities. As such, $v_a(\Delta t)$ can be formulated such that it generally approximates this boundary. In such fashion, inter-event velocities that exceed statistical norms exhibited by collected gameplay data can result in a larger velocity difference term ($v_d$) and, therefore, receive a lower event probability from p(Δx, Δt).

As yet another example, one or more regression analyses can be performed in order to determine or obtain the velocity threshold $v_a(\Delta t)$. In particular, a supervised binary classifier can be trained on a provided set of game data, such as inter-event velocity data. The set of game data can include data classified as indicative of cheating game behavior as well as data classified as indicative of non-cheating game behavior. For example, such game data can have been manually flagged based upon player reports, detection by operations personnel, or other cheat detection algorithms, and can be used to train the binary classifier. As an example, the trained supervised binary classification model can be a logistic regression, such as, for example, an L2-regularized logistic regression. Other coefficients to be used or included in the probability function p(Δx, Δt) can also be obtained or determined using regression analyses in such fashion.

The velocity threshold term $v_a$ can be a single expression or can be piecewise in nature. For example, in one implementation, $v_a$ can equal a first constant value for all Δt less than a minimum value; can be one or more linear or logarithmic functions of Δt for all Δt greater than the minimum value but less than a maximum value; and can equal a second constant value for all Δt greater than the maximum value.

Figure 5:
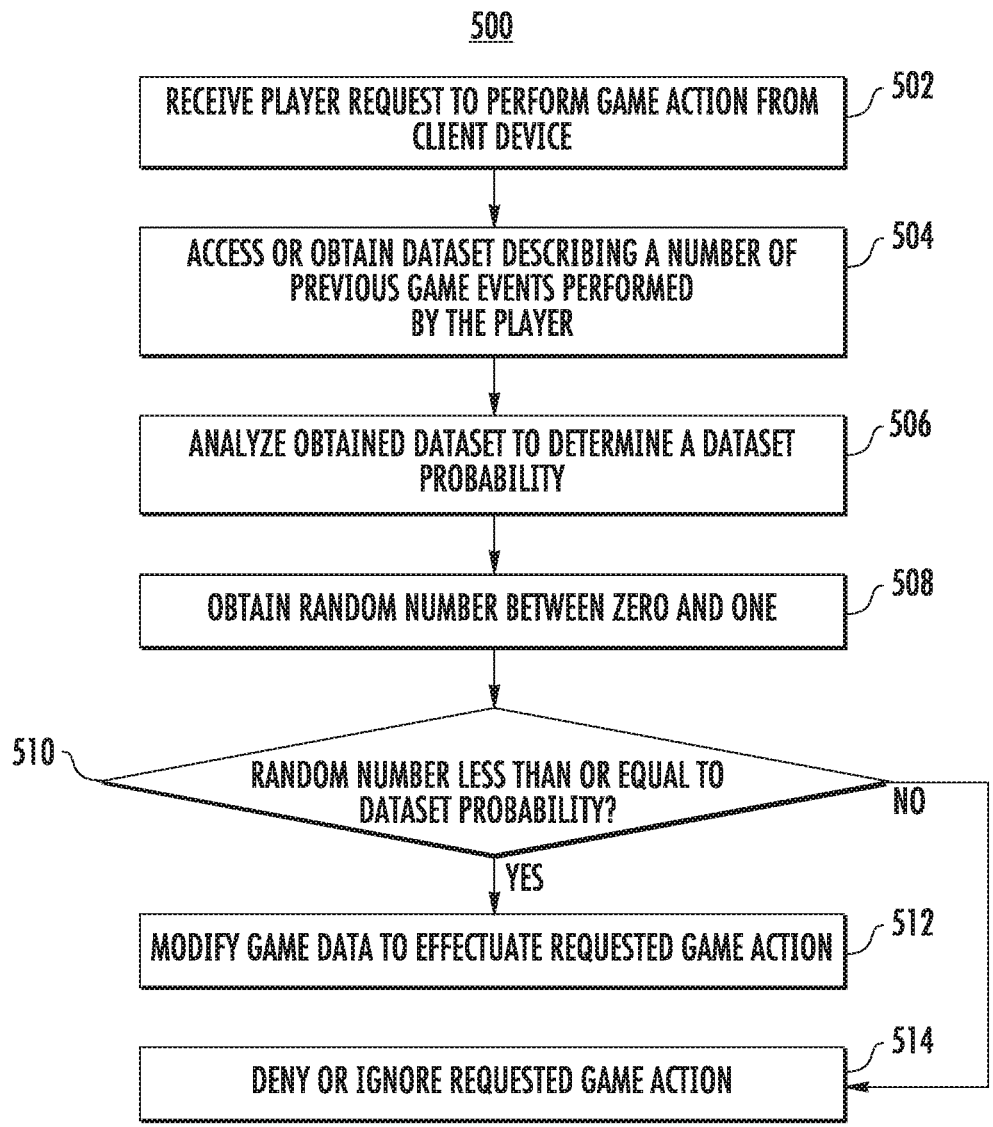
FIG. 5 depicts a flowchart of an example method for detecting and preventing cheating in a location-based game according to an example embodiment of the present disclosure.

FIG. 5 depicts a flowchart of an example method (500) for detecting and preventing cheating in a location-based game according to an example embodiment of the present disclosure. Although FIG. 5 depicts steps performed in a particular order for purposes of illustration and discussion, various steps of the method (500) can be omitted, rearranged, combined, and/or adapted in various ways without deviating from the scope of the present disclosure.

At (502) a player request to perform a game action can be received from a client device. At (504) a dataset describing a number of previous game events performed by the player can be accessed or obtained.

At (506) the obtained dataset can be analyzed to determine a dataset probability. As an example, the dataset probability can range from zero to one. For example, a dataset probability of 0.2 can indicate that there is only a 20% chance that the game events included in the dataset obtained at (504) represent legitimate gameplay.

At (508) a random number between zero and one can be obtained. For example, various random number generators or algorithms can be used to obtain a random number. The random number generator can be constrained to provide a random number between zero and one (i.e. greater than or equal to zero and less than or equal to one).

At (510) it can be determined whether the random number obtained at (508) is less than or equal to the dataset probability determined at (506).

If it is determined that the random number is less than or equal to the dataset probability, then at (512) game data can be modified to effectuate the game action requested at (502).

However, if it is determined at (510) that the random number is greater than the dataset probability, then at (514) the requested game action can be denied or ignored.

In such fashion, a random number generator can be used to translate the determined dataset probability into a percentage change that the game action will be effectuated.

Figure 6:
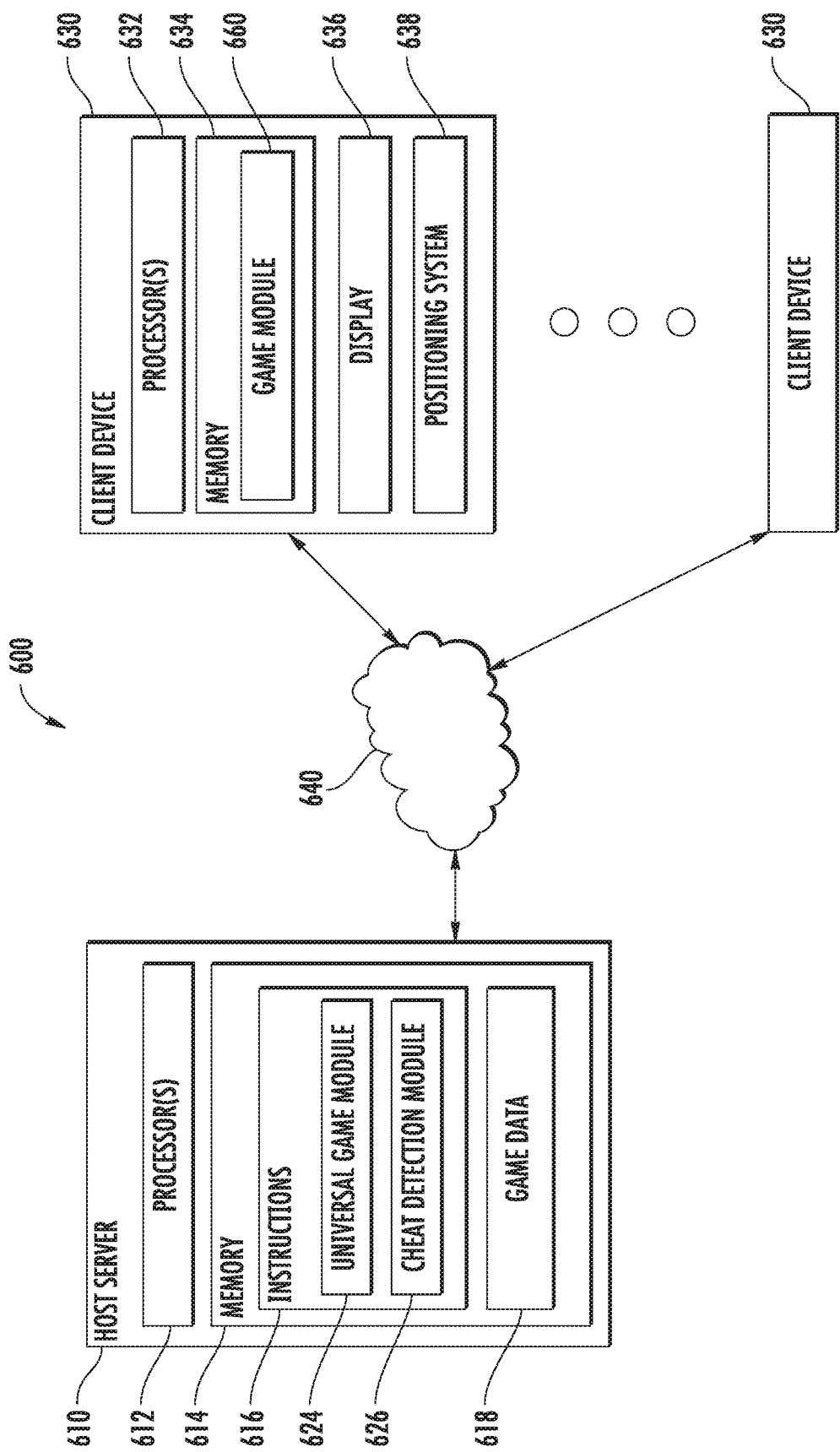
FIG. 6 depicts an example gaming system according to an example embodiment of the present disclosure.

FIG. 6 depicts an example gaming system 600 according to an example embodiment of the present disclosure. The system 600 has a client-server architecture that includes a host server 610 that communicates with one or more client devices 630 over a network 640.

Host server 610 can host a multiplayer game and can perform various operations to implement the present disclosure. The host server 610 can be implemented using one computing device or a plurality of computing devices organized according to a parallel computing architecture, a sequential computing architecture, or a combination of such architectures.

The host server 610 can have a processor(s) 612 and a memory 614. The host server 610 can also include a network interface used to communicate with one or more remote computing devices (e.g. client devices) 630 over the network 640.

The processor(s) 612 can be any suitable processing device, such as a microprocessor, microcontroller, integrated circuit, or other suitable processing device. The memory 614 can include any suitable computer-readable medium or media, including, but not limited to, non-transitory computer-readable media, RAM, ROM, hard drives, flash drives, or other memory devices.

The memory 614 can store information accessible by processor(s) 612, including instructions 616 that can be executed by processor(s) 612. The instructions 616 can be any set of instructions that when executed by the processor(s) 612, cause the processor(s) 612 to provide desired functionality. For instance, the instructions 616 can be executed by the processor(s) 612 to implement a universal game module 624, and a cheat detection module 626.

Universal game module 624 can control aspects of the game for all players and receives and processes each player's input in the game. On the client-side, each client 630 can include a game module 660 that operates as a gaming application so as to provide a user with an interface to the system 600 and corresponding game. The host server 610 transmits game data over the network 640 to each client device 630 for use by the game module 660 at the client device 630 to provide local versions of the game to players at locations remote from the host server 610.

The term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

The host server 610 can implement cheat detection module 626 to implement aspects of the present disclosure, including example methods (100), (200), and (500). In particular, cheat detection module 626 can be implemented prior to effectuating a requested game action to analyze past game events and determine a probability that they reflect legitimate gameplay. The probability can be used to determine whether to effectuate the requested game action or can be used to scale a number of points rewarded.

In addition, while universal game module 626 and cheat detection module 626 are shown as separate modules in FIG. 6, they can be combined or otherwise implemented synchronously.

Also included in memory 614 can be game data 618. Game data 618 can store data that describes or controls a current status of all features or elements of the game. Host server 610 can modify game data 618 to implement any desired change in status of the game.

The host server 610 can exchange data with one or more client devices 630 over the network 640. Although two clients 630 are illustrated in FIG. 6, any number of client devices 630 can be connected to the host server 610 over the network 640. The client devices 630 can be any suitable type of computing device, such as a general purpose computer, special purpose computer, laptop, desktop, mobile device, smartphone, tablet, wearable computing device, dedicated gaming console, or other suitable computing device.

Similar to host server 610, a client device 630 can include a processor(s) 632 and a memory 634. The memory 634 can store information accessible by processor(s) 632, including instructions that can be executed by processor(s) 632 and data. For example, memory 634 can include a game module 660, a hash module 662, and an account manifest 664.

As discussed above, game module 660 can perform or direct all client-side game actions. As an example, game module 660 can be an application downloaded from a content distribution platform or can be a program read from an inserted disc or other memory means.

The client device 630 can include various input/output components for providing and receiving information from a user, such as a touch screen, touch pad, data entry keys, gaming controller, speakers, and/or a microphone suitable for voice recognition. For instance, the computing device 630 can have a display 636 for presenting information, such as a game interface.

In the case that the game is a location-based game, the client device 630 is preferably a portable computing device, such as a smartphone or other portable device, that can be easily carried or otherwise transported with a player. The client device 630 can include a positioning system 638 that monitors the position of a player during game play. The positioning system 638 can be any device or circuitry for monitoring the position of the client device 630. For example, the positioning system 638 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position.

Importantly, however, data describing a player's position is only collected after the player has been informed of and provided consent to how such data is collected, when such data is collected, and how such data is used in the context of the location-based game.

The network 640 can be any type of communications network, such as a local area network (e.g. internet), wide area network (e.g. Internet), or some combination thereof. The network 640 can also include a direct connection between a client device 630 and the host server 610. In general, communication between the host server 610 and a client device 630 can be carried via network interface using any type of wired and/or wireless connection, using a variety of communication protocols (e.g. TCP/IP, HTTP), encodings or formats (e.g. HTML, XML), and/or protection schemes (e.g. VPN, secure HTTP, SSL).

Each example discussed above is provided by way of explanation of the invention, not limitation of the invention. In particular, features illustrated or described as part of one embodiment can be used with another embodiment to yield a still further embodiment. Thus, those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for discouraging cheating, the method comprising:
    hosting, by one or more computing devices, a location-based game;

logging, by the one or more computing devices, event locations and event times for a plurality of game events, each game event associated with one of the event locations and one of the event times;

receiving, by the one or more computing devices, a request to effectuate a requested game action, the request having a request location and a request time;

calculating, by the one or more computing devices, an inter-event velocity based on a difference between the request location and at least one of the event locations and difference between the request time and at least one of the event times;

inputting, by the one or more computing devices, the inter-event velocity into a probability function to obtain an event probability; and determining, by the one or more computing devices, whether to effectuate the requested game action based on the event probability.

2. The method of claim 1, wherein the event probability represents a probability that the inter-event velocity reflects legitimate gameplay.

3. The method of claim 1, further comprising:
in response to determining to effectuate the requested game action:
modifying game data to effectuate the requested game action; and
creating a database entry reflecting the requested game action in a game database.

4. The method of claim 1, further comprising:
determining a number of points to reward to a player for a completed game action by multiplying an expected number of points by the event probability.

5. The method of claim 1, further comprising:
in response to determining not to effectuate the requested game action:
transmitting, by one or more computing devices, an indication that the game action was denied.

6. The method of claim 1, wherein the probability function includes a velocity threshold term that reflects a boundary between legitimate gameplay and cheating.

7. The method of claim 6, wherein the probability function comprises a logistic function with the constant e raised to a velocity difference term, the velocity difference term being the velocity threshold term subtracted from the inter-event velocity, such that the probability function trends toward zero as the inter-event velocity increases in magnitude with respect to the velocity threshold term and trends towards one as the inter-event velocity decreases in magnitude with respect to the velocity threshold term.

8. The method of claim 6, wherein the probability function is a logistic function that provides an output based on the difference between the inputted inter-event velocity and the velocity threshold term.

9. The method of claim 6, wherein the velocity threshold term is modeled on gameplay data previously received by a game server.

10. The method of claim 6, wherein the velocity threshold term is generated by training a supervised binary classifier on a set of game data previously classified as indicative of either cheating behavior or non-cheating behavior.

11. A non-transitory computer-readable storage medium comprising instructions executable by a processor, the instructions comprising:
instructions for sending, from a client device, event locations and event times for a plurality of game events, each game event associated with one of the event locations and one of the events times;
instructions for sending a request to effectuate a requested game action, the request including a request location and a request time;
instructions for receiving a decision of whether to effectuate the requested game action, wherein the decision was determined by:
calculating an inter-event velocity based on a difference between the request location and at least one of the event locations and difference between the request time and at least one of the event times; and
inputting the inter-event velocity into a probability function to obtain an event probability; and
instructions for displaying a result of the request based on the decision.

12. The non-transitory computer-readable storage medium of claim 11, wherein the event probability represents a probability that the inter-event velocity reflects legitimate gameplay.

13. The non-transitory computer-readable storage medium of claim 11, wherein the instructions to display the result comprise:
instructions for receiving modified game data describing the effectuation of the requested game action.

14. The non-transitory computer-readable storage medium of claim 11, wherein the instructions to display the result comprise:
instructions to display a notification of a number of points awarded to a player for completing the game action, wherein the number of points was determined by multiplying an expected number of points by the event probability.

15. The non-transitory computer-readable storage medium of claim 11, wherein the instructions to display the result comprise:
instructions for displaying an indication that the game action was denied.

16. The non-transitory computer-readable storage medium of claim 11, wherein the probability function includes a velocity threshold term that reflects the boundary of legitimate gameplay and cheating.

17. The non-transitory computer-readable storage medium of claim 16, wherein the probability function comprises a logistic function with the constant e raised to a velocity difference term, the velocity difference term being the velocity threshold term subtracted from the inter-event velocity, such that the probability function trends toward zero as the inter-event velocity increases in magnitude with respect to the velocity threshold term and trends towards one as the inter-event velocity decreases in magnitude with respect to the velocity threshold term.

18. The non-transitory computer-readable storage medium of claim 16, wherein the probability function is a logistic function that provides an output based on the difference between the inputted inter-event velocity and the velocity threshold term.

19. The non-transitory computer-readable storage medium of claim 16, wherein the velocity threshold term is modeled on gameplay data previously received by a game server.

20. The non-transitory computer-readable storage medium of claim 16, wherein the velocity threshold term is generated by training a supervised binary classifier on a set of game data previously classified as indicative of either cheating behavior or non-cheating behavior.

* * * * *

UNITED STATES PATENT AND TRADEMARK OFFICE
CERTIFICATE OF CORRECTION

PATENT NO. : 10,912,989 B2
APPLICATION NO. : 16/600333
DATED : February 9, 2021
INVENTOR(S) : Kornmann et al.

Page 1 of 1

It is certified that error appears in the above-identified patent and that said Letters Patent is hereby corrected as shown below:

In the Claims

In Column 13, in Claim 11, Line 67, delete "events times" and insert -- event times --, therefor.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*